United States Patent [19]

McCarty

[11] 4,305,597
[45] Dec. 15, 1981

[54] KEYLESS SELF-TIGHTENING CHUCK

[75] Inventor: George W. McCarty, Lutherville, Md.

[73] Assignee: Black & Decker Inc., Newark, Del.

[21] Appl. No.: 95,394

[22] Filed: Nov. 19, 1979

[51] Int. Cl.³ .............................................. B23B 31/12
[52] U.S. Cl. ...................................... 279/22; 279/59; 279/64; 279/72
[58] Field of Search ....................... 279/56, 57, 58, 59, 279/60, 64, 70, 72, 75, 81, 22

[56] References Cited

U.S. PATENT DOCUMENTS 2,910,302 10/1959 Ondeck .............................. 279/56 X
4,252,333 2/1981 Vogel ..................................... 279/72

Primary Examiner—Robert D. Baldwin
Attorney, Agent, or Firm—Harold Weinstein; Leonard Bloom; Edward D. Murphy

[57] ABSTRACT

A bi-directional, self-tightening chuck for releasably gripping a tool bit such as a twist drill or the like includes a bit receiving nosepiece having a conical, internal opening formed therein. A control sleeve is rotatably mounted, through a thrust bearing, on the nosepiece and is adjustably connected to a chuck body to enable adjustment of the axial position of the nosepiece relative to the chuck body. Tapered gripping elements, which may take the form of cone-like gripping rollers or wedge-like jaws, are located in the internal opening of the nosepiece and are adapted to forcibly grip the stem portion of the tool bit in response to a hand-tightening adjustment of the control sleeve on the chuck body and further adapted to self-tighten in response to an axially directed thrust force applied to the gripping elements by a torque-responsive cam assembly. The cam assembly is located between the gripping elements and the chuck body and develops the axial thrust force in response to the torque applied through the tool bit to cause the gripping elements to self-tighten. In the preferred embodiment, the torque responsive cam assembly includes opposed, axial-face cams each having complementary sets of oppositely inclined ramp surfaces formed thereon with ball elements separating the cams. The torque applied through the tool bit causes the face cams to rotate relative one another to develop and apply the axially directed thrust force to the gripping elements to increase the gripping force.

23 Claims, 29 Drawing Figures

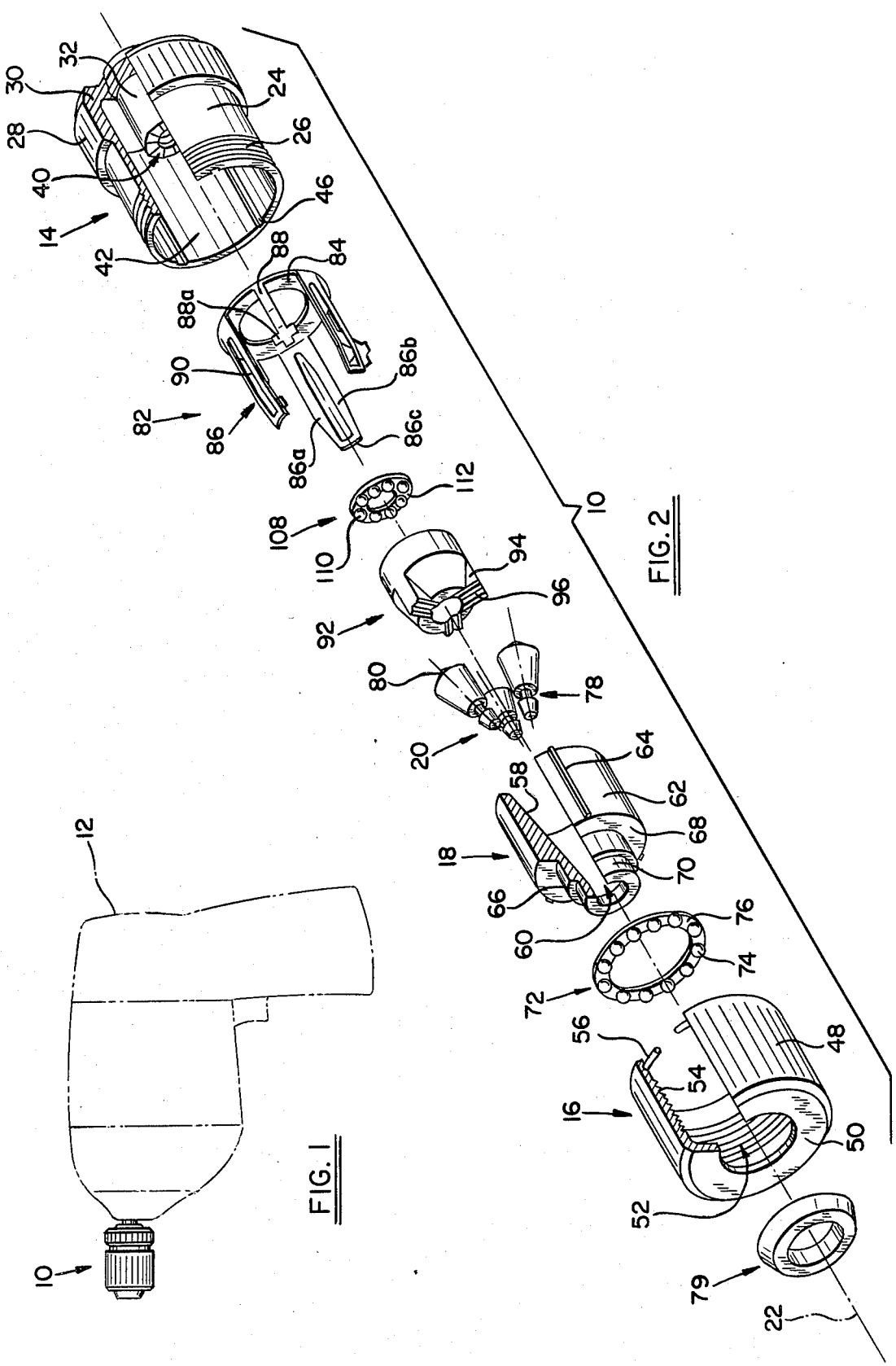

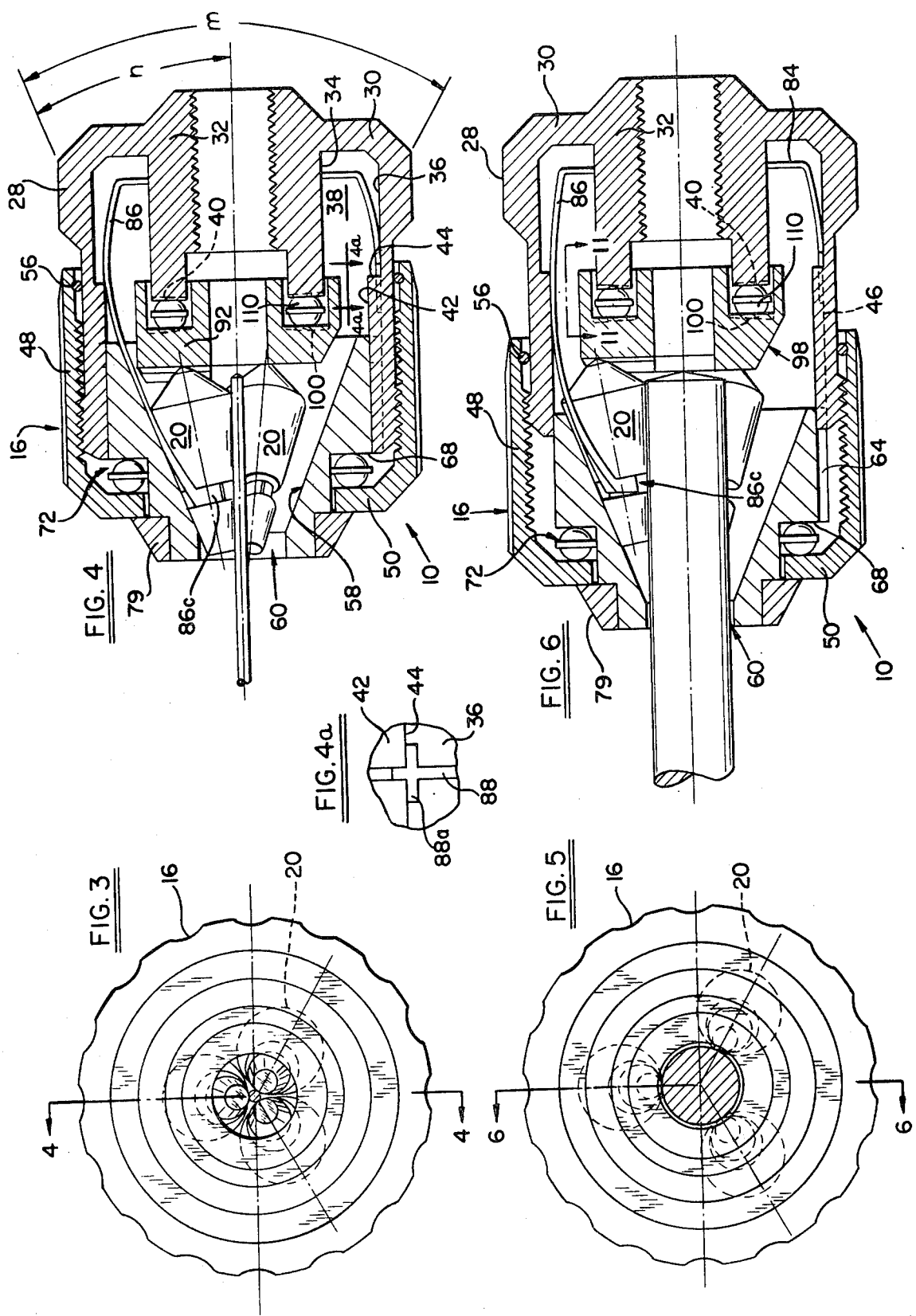

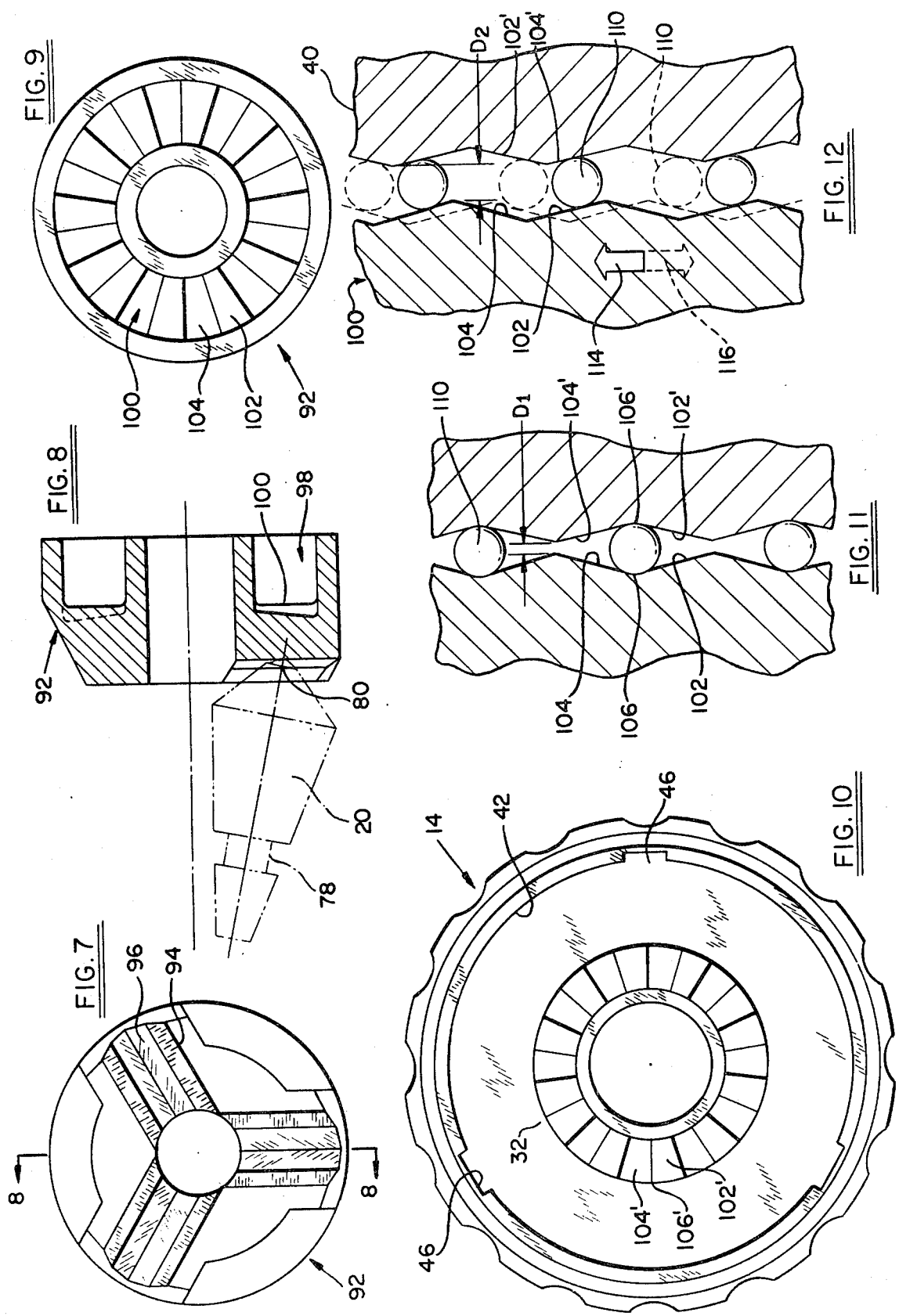

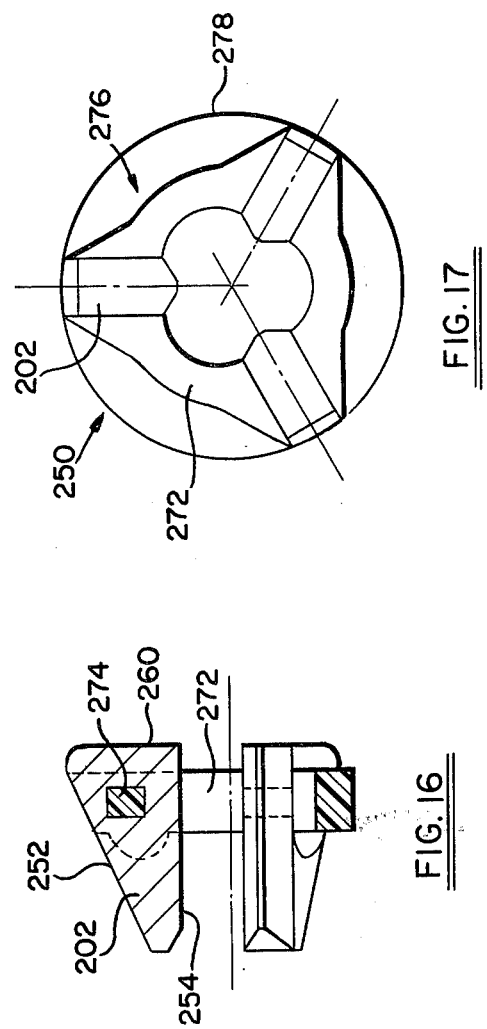
FIG.17
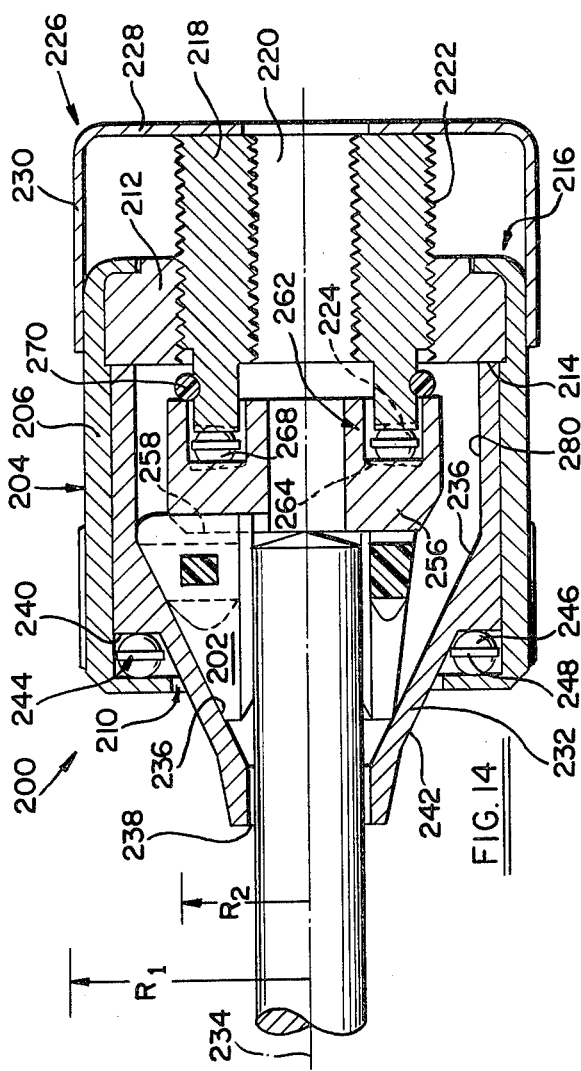
FIG.14
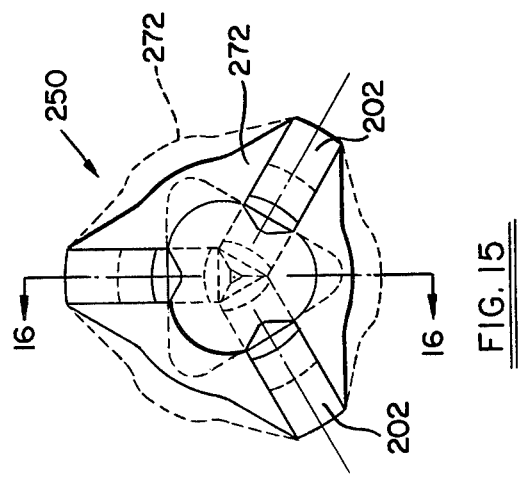
FIG.16
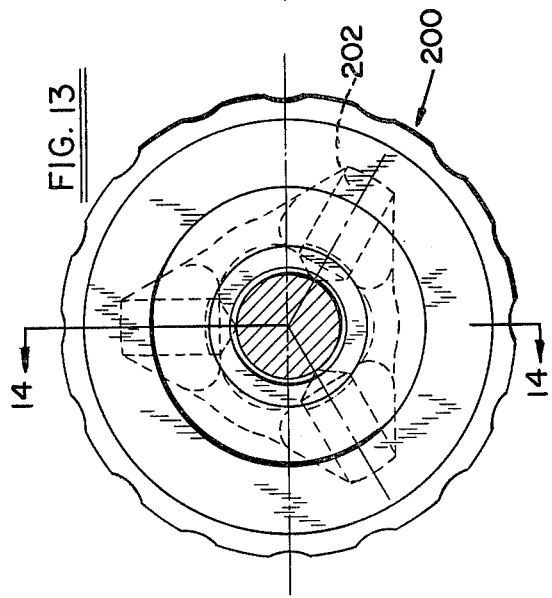
FIG.13
FIG.15

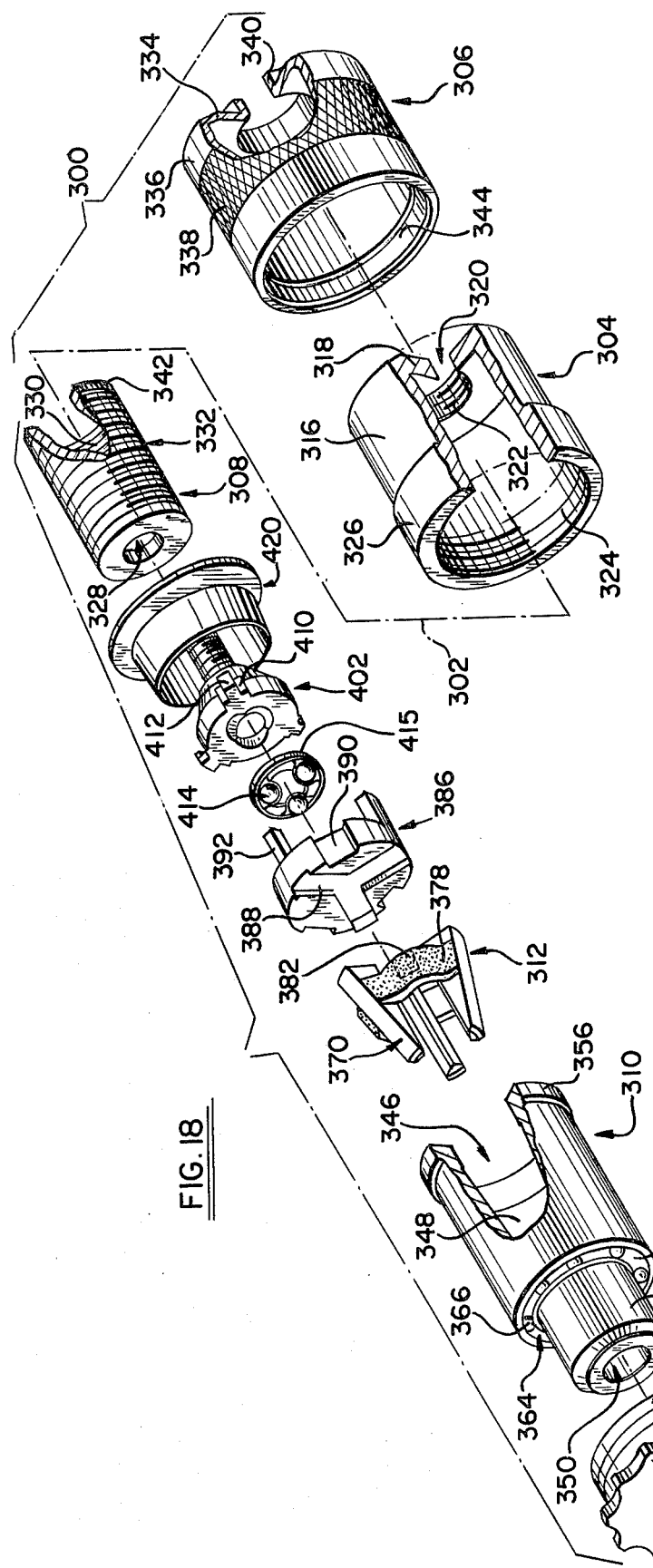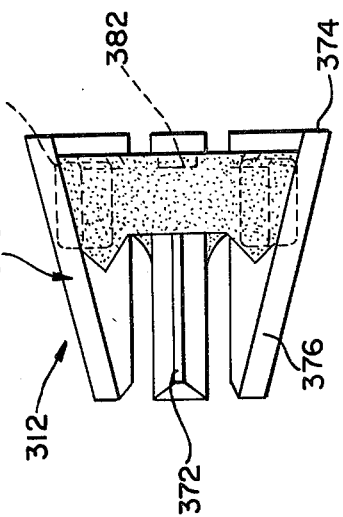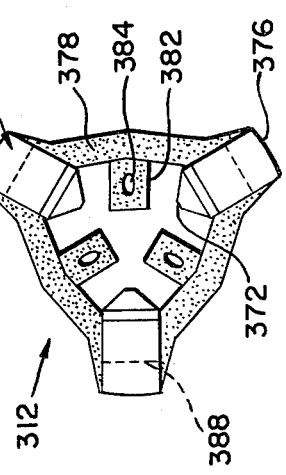

KEYLESS SELF-TIGHTENING CHUCK

CROSS REFERENCE TO RELATED APPLICATIONS

The subject matter of the present patent application is related to that disclosed in co-pending U.S. Pat. No. 4,252,333 issued Feb. 24, 1981, by J. D. Vogel for a Keyless Chuck and to U.S. patent application Ser. No. 71,663, filed on Aug. 31, 1979 by Silvio Bilanceri for a Keyless Self-Tightening Chuck, both inventions of which are assigned to the assignee of the present invention.

BACKGROUND OF THE INVENTION

The present invention relates to a chuck for releasably gripping a tool bit and, more specifically, to a keyless, self-tightening chuck which increases the gripping force on a tool bit in response to the torque applied through the tool bit to the work piece.

Various types of chucks are known for releasably gripping the stem of a tool bit such as a twist drill. The most common chuck in use is the so-called Jacobs chuck which includes a nosepiece and an adjusting sleeve that is adjusted to cause gripping jaws located within the nosepiece to forcibly grip the drill bit. The adjusting sleeve typically includes a plurality of axially extending gear teeth that are adapted to cooperate with a gear-type key to permit manual tightening and loosening of the jaws. The Jacobs-type chuck generally provides satisfactory performance although the requirement for a separate adjusting key necessitates a minimum level of manual skill to effect proper tightening, since, if the jaws are not tight enough, the drill bit will rotate relative to the jaws during the drilling operation and cause spalling of the drill bit stem. Also, the use of a key to tighten and loosen the chuck increases the time needed to insert or remove a tool bit, and, from a more practical standpoint, the key represents another part that is subject to mechanical wear with repeated use and another part which the chuck user must keep track of.

A number of drill chucks, known generically as keyless chucks, have been designed in an effort to eliminate the need for the tightening key. These chucks are adapted to apply an initial, hand-tightened gripping force to the drill bit with the gripping force self-tightening or proportionally increasing in response to the torque applied through the drill bit during the drilling operation.

Some of these self-tightening chucks have been provided with gripping jaws which toggle in response to the reaction torque encountered by the drill bit, and still others have been provided with cam-like surfaces which contact and cooperate with the gripping jaws to increase the gripping force. While most self-tightening chucks operate in a generally satisfactory manner, in some designs the portion of the gripping force that results from the self-tightening feature varies with the diameter of the particular drill bit being gripped in the chuck. In addition, the ratio of self-tightening gripping force to the hand-tightened gripping force can be undesirably low, that is, the portion of the total gripping force that results from the auto or self-tightening feature of the chuck is smaller than the portion that results from the initial hand-tightening of the chuck. Since most keyless chucks are designed for industrial rather than consumer applications, they tend to be fabricated as relatively large, machined assemblies that are expensive to produce.

One example of a self-tightening keyless chuck is shown in U.S. Pat. No. 2,910,302 to E. Ondeck. The chuck disclosed therein includes a tool receiving nosepiece that cooperate with wedge-like jaws to grip a tool bit. The nosepiece is rotated by hand to apply an initial hand-tightened gripping force to the tool bit with the self-tightening gripping force provided by a cam plate that includes cam tracks that are operative for one direction of rotation of chuck and inoperative for the other direction of rotation.

While this chuck is generally satisfactory in operation, the axial thrust force and the consequent self-tightening of the jaws is produced in response to a uni-directional reaction torque, that is, the desirable self-tightening feature occurs only for rotation in one direction with rotation in the opposite direction causing the chuck to loosen and release the drill bit. Also, from a practical standpoint, the chuck is fabricated from rather large, machined elements which increase the manufacturing costs of the chuck.

SUMMARY OF THE INVENTION

In view of the above, it is a broad, overall object of the present invention, among others, to provide a tool holding chuck which eliminates the need for a tightening key and which is reliable in operation.

It is another object of the present invention to provide a keyless chuck which can be reliably and effectively operated by those having a minimum level of mechanical skills.

It is still another object of the present invention to provide a self-tightening chuck in which the gripping force applied to the tool bit increases in response to the torque applied through the tool bit to the work piece.

It is a further object of the present invention to provide a bi-directional, self-tightening chuck in which the gripping force applied to the tool bit increases in response to the reaction torque encountered by the bit regardless of the direction of rotation of the chuck.

It is a further object of the present invention to provide a self-tightening chuck which is reliable in operation and relatively immune to particulate and foreign matter contamination.

It is still a further object of the present invention to provide a bi-directional, self-tightening chuck in which the ratio of the self-tightening gripping force to the hand-tightened gripping force is comparitively high and in which the self-tightening feature is effective for both small and large diameter tool bits.

In accordance with these objects, and others, the present invention provides a keyless, self-tightening chuck that includes a nose piece having a conical, internal opening formed therein as a surface of revolution about an axis. A plurality of tapered gripping elements, for example, cone-like gripping rollers or wedge-like jaws, are located in the internal opening and are adapted to grip the stem of a tool bit, such as a twist drill. A control sleeve is rotatably mounted on the nosepiece through a thrust bearing and is adjustably connected to a chuck body to permit hand-tightening of the jaws against the tool bit. A torque-responsive thrust-developing-means is located between the gripping elements and the chuck body and is operative to increase the gripping force on the tool bit in response to the torque applied through the tool bit to the work piece.

In operation, the stem portion of a tool bit such as a twist drill is inserted into the chuck and the control sleeve manually adjusted to cause the gripping elements to grip the drill bit with an initial, hand-tightened gripping force. When the drill bit is applied to a work piece, the torque applied through the drill bit to the work piece causes the thrust developing means to apply a torque-responsive thrust force to the gripping elements to cause them to increase their gripping force. When the bit is removed from the work piece, the axially directed thrust force is removed from the gripping elements and the gripping force returns to the initial hand-tightened magnitude.

In one embodiment, the bi-directional thrust developing means takes the form of opposed, axial-face cams each having complementary sets of oppositely inclined ramp surfaces or cam tracks formed thereon with rolling elements separating the cams. Relative rotation of the cam surfaces in either direction causes an axially directed thrust force to be applied against the gripping elements to increase the gripping force in response to the torque applied through the tool bit. In another embodiment, the oppositely inclined cam tracks are formed on the head portion of the locking screw that locks the chuck to the spindle of the drive source. Elastomer seals are provided to protect the cam surfaces from particulate material and other foreign matter.

The present invention advantageously eliminates the need for a tightening key with its attendant mechanical skill requirement to provide a self-tightening chuck of high efficiency for both unidirectional and bidirectional applications and which is relatively immune to particulate contamination or the like. The ratio of the self-tightening gripping force to the hand-tightening gripping force is comparatively high, and the self-tightening feature is effective for both large and small diameter tool bits.

DESCRIPTION OF THE DRAWINGS

The above description, as well as the objects, features, and advantages of the present invention will be more fully appreciated by reference to the following detailed description of the presently preferred, but nonetheless illustrative, embodiments in accordance with the present invention, when taken in conjunction with the accompanying drawings wherein:

FIG. 1 is a side elevational view of a chuck in accordance with the present invention mounted on an exemplary pistol-grip electric drill (broken-line illustration);

FIG. 2 is an exploded perspective view of the drill chuck of FIG. 1 with selected parts broken-away for reasons of clarity;

FIG. 3 is a partial end view of the drill chuck of FIG. 1 showing the chuck gripping a small-diameter drill bit;

FIG. 4 is a side elevational view, in cross-section, of the chuck shown in FIG. 3 taken along line 4—4 of FIG. 3;

FIG. 4a is a partial plan view of a interior surface portion of the chuck of FIG. 4 taken along line 4a—4a of FIG. 4;

FIG. 5 is a partial end view, similar to that of FIG. 3, showing the drill chuck of FIG. 1 gripping a large-diameter drill bit;

FIG. 6 is a side elevational view, in cross-section, of the chuck shown in FIG. 5 taken along line 6—6 of FIG. 5;

FIG. 7 is a frontal view, in detail, of a thrust block showing radially aligned grooves for retaining gripping elements;

FIG. 8 is a side elevational view, in cross-section, of the thrust block of FIG. 7 taken along line 8—8 of FIG. 7 showing a gripping element (broken-line illustration) positioned relative to its retaining groove;

FIG. 9 is a rear elevational view of the thrust block of FIGS. 7 and 8 showing repeating cam surfaces of an axial-face cam;

FIG. 10 is an end view of the interior portion of the chuck body of FIG. 1 showing repeating cam surfaces of another axial-face cam that are adapted to cooperate with the cam surfaces shown in FIG. 9;

FIG. 11 is a detail view, in partial cross-section, showing the complementary axial-face cams of FIGS. 9 and 10 separated by rolling elements with the cams in an axially opposed, neutral relationship;

FIG. 12 is a detail view, similar to that of FIG. 11, showing the complementary cam surfaces rotated relative to one another when compared to their position shown in FIG. 11;

FIG. 13 is a partial end view of another embodiment of a chuck in accordance with the present invention gripping a large-diameter drill bit;

FIG. 14 is a side elevational view, in cross-section, of the drill chuck shown in FIG. 13 taken along line 14—14 of FIG. 13;

FIG. 15 is a plan view of a gripping jaw assembly of the drill chuck shown in FIG. 14 showing three gripping jaws connected together by resilient links in their open position (solid-line illustration) and in their closed position (broken-line illustration);

FIG. 16 is a side elevational view, in cross-section, of the gripping jaw assembly of FIG. 15 taken along line 16—16 of FIG. 15;

FIG. 17 is a plan view of a variation of the jaw assembly of FIGS. 15 and 16 showing a flange-like dust shield formed as part of the jaw assembly;

FIG. 18 is an exploded perspective view of still another embodiment of a chuck in accordance with the present invention with selected parts broken away for reasons of clarity;

FIG. 19 is a frontal view, in enlarged detail, of a jaw assembly shown in FIG. 18;

FIG. 20 is a side elevation view, in enlarged detail, of the jaw assembly shown in FIG. 19;

DESCRIPTION OF THE PREFERRED EMBODIMENT

Figure 21:
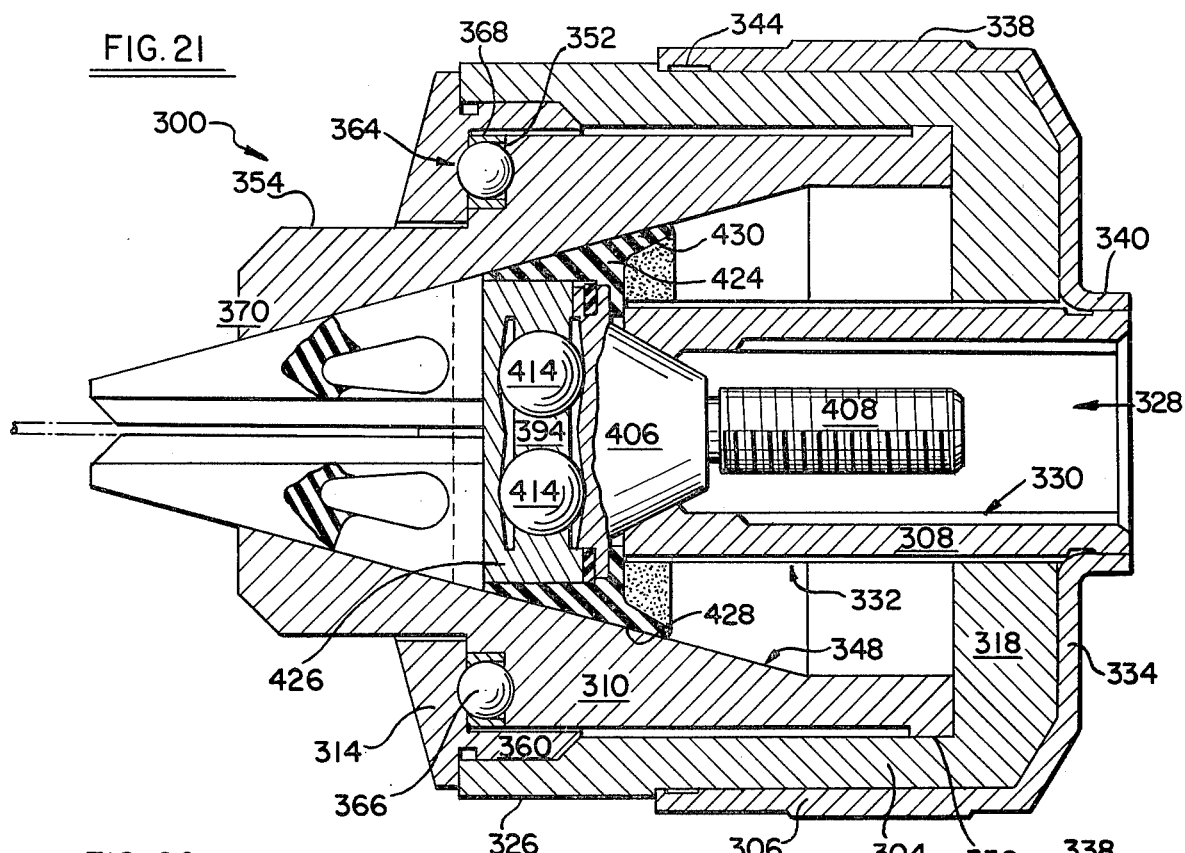
FIG. 21 is a side elevation view, in cross-section, of the chuck shown in FIG. 18 gripping a small-diameter tool bit.

A drill chuck in accordance with the present invention is generally referred to in the figures by the reference character 10 and is shown in FIG. 1 mounted on an exemplary pistol-grip electric drill 12 (broken-line illustration). As shown in FIG. 2 and in the cross-section views of FIGS. 4 and 6, the chuck 10 includes a chuck body 14, a control sleeve 16 rotatably connected to the chuck body, a nosepiece 18 located within the control sleeve, and a plurality of gripping cones 20 located within the nosepiece.

The chuck body 14 is generally formed as a hollow body of revolution about an axis 22 and includes a outer tubular portion 24 having external threads 26 formed at a forward end and a raised gripping surface 28 formed at the rearward end of the chuck body 14. The gripping surface 28 is preferably provided with a striated or knurled pattern to permit convenient manual gripping. An inwardly extending flange 30 connects the tubular portion 24 with an internally threaded hub 32. The hub 32 is adapted to engage the externally threaded spindle (not shown) of a drive source such as the pistol-grip electric drill 12 shown in FIG. 1. Conventional locking means such as a locking screw (not shown) having a thread sense opposite to that of the drive spindle may be provided to secure the chuck 10 to the spindle. The hub 32 extends in an axially forward direction of the flange 30 with the outside diameter surface 34 of the hub smaller than the inside diameter surface 36 of the tubular portion 24 to define an annular recess 38 therebetween. The forward end of the hub 32 is provided with an axial-face cam surface which is generally designated by the reference character 40 and which is described in more detail below. A reduced inside diameter surface 42 is provided on the forward portion of the chuck body 14 to define a shoulder 44 and a plurality of equally spaced, longitudinally extending keyways 46 are formed in the reduced inside diameter surface 42. The keyways 46 are adapted to mate with complementary keys formed on the nosepiece 18 as described below.

The control sleeve 16 includes an outer, tubular barrel 48 with an inwardly extending flange 50 that defines an opening 52 formed at the forward end. The control sleeve 16 includes internal threads 54 which engage the external threads 26 on the tubular portion 24 of the chuck body 14 to permit relative adjustment between the control sleeve and the chuck body. An elastomer "O" ring 56 is located within a groove formed near the rearward end of the control sleeve 16 and functions both as a dust and contamination seal and as a resilient stop to prevent the control sleeve from unintentionally separating from the chuck body 14. The "O" ring 56 can be manually overridden, if desired, to disassemble the control sleeve 16 from the chuck body 14.

The nosepiece 18 is formed as a hollow body of revolution about the axis 22 and includes a conical opening defined by an internal tapered surface 58 formed about the axis 22 with the tapered surface subtending a cone angle M as shown in FIG. 4. The tapered surface 58 converges from a wider end to a narrow, forward end with a tool receiving opening 60 formed at the forward end. The outside diameter surface 62 of the nosepiece 18 includes a plurality of equally spaced, longitudinally extending keys 64 (FIG. 2) that are adapted to fit into the longitudinally extending keyways 46 of the chuck body 14 so that the nosepiece 18 can move axially relative to the chuck body 14 without relative rotation. The outer surface of the nosepiece 18 includes a reduced diameter surface 66 that defines a shoulder 68 and another reduced diameter surface 70 that extends forwardly through the clearance opening 52 in the control sleeve 16.

An anti-friction thrust bearing 72, including a plurality of ball elements 74 and a separator 76, is located between the shoulder 68 of the nosepiece 18 and the inner face of the flange 50 of the control sleeve 16 to permit the control sleeve to rotate relative to the nosepiece 18. A retainer ring or collar 79 is press or shrink fitted to the forwardly extending surface 70 of the nosepiece 18 to retain the control sleeve 16 and the thrust bearing 72 in place on the nosepiece. The control sleeve 16 and collar 79 provide the chuck body with a blunt or square-ended appearance.

The gripping cones 20 are formed as truncated conical elements with a peripheral recess or groove 78 formed near their narrow, forwardly facing end. The wider, rearwardly facing end of each gripping cone 20 is conically tapered to provide a blunt end 80 and give each gripping cone a biconical appearance. The cone angle N of the gripping cones 20 is one-half that of the cone angle M of the internally tapered surface 58 such that the gripping cones, when abutting the internally tapered surface, present a surface portion thereof that faces radially inward and that is adapted to contact and grip the stem portion of the tool bit. As described below, these inwardly facing tool-gripping surface portions are maintained substantially parallel to, equally spaced from, and concentric with the axis 22 throughout the range of adjustment of the chuck 10. Cone angles M that are suitable for the internally tapered surface 58 are 45° and 30°, respectively, and correspondingly suitable cone angles N for the gripping cones 20 are 22.5° and 15°.

A spring retainer 82 positions and retains the gripping cones 20 in place against the internally tapered surface 58. The retainer 82, which may be formed from die-stamped and heat-treated beryllium copper, includes (FIG. 2) an annular base 84 that is generally transverse to the axis 22 with three equally spaced retainer arms 86 and alternating locking tabs 88 extending in an axially forward direction from the outer edge of the base 84. The retainer arms 86 each include an elongated, axially extending opening 90 that divides each arm into spaced apart ribs 86a and 86b. A curved bridge 86c spans the free or distal ends of the ribs 86a and 86b of each arm 86. Each locking tab 88, which is shorter in length than the retainer arms 86, has a cross-piece 88a formed near its distal end to give the end portion of each tab a cruciform appearance. As shown in FIGS. 4 and 5, the base 84 of the spring retainer 82 is located in the annular recess 38 defined between the hub 32 and the tubular portion 24 of the chuck body 14. The retainer arms 86 extend in an axially forward direction with the curved bridge 86c of each arm positioned in the annular recess 78 of each gripping cone 20 on the side opposite from the tapered surface 58. The retaining arms 86 deflect inwardly as they extend in the forward direction to resiliently urge the gripping cones 20 outwardly against the tapered surface 58. The spring retainer 82 is fixed in place by the locking tabs 88 with the axially extending distal end of each tab located within the keyways 46 of the chuck body 14 and the cross-piece 88a abutting the shoulder 44 as shown in FIGS. 4, 4a, and 6. The spring retainer 82 is thus secured against rotation relative to the chuck body 14 and, in its secured position, resiliently urges the gripping cones 20 against the internally tapered wall 58 throughout the range of adjustment of the chuck 10.

A thrust block 92 is mounted on the forwardly extending end of the hub 32 with the forward side of the thrust block, as shown in FIGS. 2 and 7, provided with three equally spaced, radially extending abutments 94 that have radially aligned grooves or channels 96 formed therein. As shown in FIG. 8, each channel 96 accepts the rearwardly facing blunt end 80 of a gripping cone 20 (shown in broken-line illustration) to provide a positive, torque-transmitting connection between the cones 20 and the thrust block 92.

The thrust block 92 establishes and maintains the angular spacing of gripping cones 20 about the axis 22, substantially aligns the blunt end 80 of the cones in a common plane (that is, a plane substantially transverse to the axis 22) and retains the blunt end 80 of each cone for movement in a substantially radially inward and outward direction. The rearwardly facing end of the thrust block 92 has a circular, axially extending recess 98 (FIG. 8) formed therein with the bottom surface of the recess provided with an axial-face cam surface, generally designated by the reference character 100, that faces the cam surface 40 of the chuck body 14.

Each of the cam surfaces 100 and 40 is provided with multi-lobular or scallop-like surfaces defined by recurring or repeating ramp sets with the cam surface 100 including circumferentially arranged (FIG. 9), oppositely inclined ramp surfaces 102 and 104 and the cam surfaces 40 (FIG. 10) including complementary, circumferentially arranged, and oppositely inclined ramp surfaces 102' and 104'. Preferred angles of inclination of the ramp surfaces relative to a plane transverse to the axis 22 are seven and ten degrees although inclination angles above and below this range, e.g. 5° to 25°, are suitable. The interior angle intersection 106 and 106' of the respective ramp sets define a neutral position or first cam means while the inclined ramp surfaces define a second cam means.

As shown in FIG. 2, the cam surfaces 100 and 40, are separated from one another by a torque-transmitting roller element, generally designated by the reference character 108, that includes a plurality of balls 110 held in position by a separator structure 112 with the balls adapted to roll relative to the cam surfaces. In FIG. 11, the cam surfaces 100 and 40 and the balls 110 are shown in their respective neutral positions in which the balls occupy the interior angle intersections 106 and 106' defined between the oppositely inclined ramps 102 and 104 and 102' and 104' of each cam surface. In the neutral position, the cam surfaces 100 and 40 are separated from each other by a minimum distance $D_1$. When the thrust block 92 or the chuck body 14 is rotated relative to the other, the balls 110 roll from their respective neutral positions along the ramps on the opposite cam surfaces to increase the axial separation distance between the two cam surfaces and thereby develop an axially directed thrust force that is applied through the thrust block 92 to the gripping cones 20. As shown in FIG. 12, when the thrust block 92 is rotated relative to the hub 32, as indicated by the arrow 114 (solid-line illustration), the balls 110 roll relative to the ramps 102 of the cam surface 100 and the ramps 104' of the cam surface 40 to increase the axial separation to an amount $D_2$. Conversely, when the thrust block 92 is rotated in the opposite direction relative to the hub 32, as indicated by the arrow 116 (broken-line illustration), the balls 110 roll relative to the ramps 104 of the cam surface 100 and the ramps 102' of the cam surface 40 to also increase the axial separation to the amount $D_2$. As can be appreciated from the example in FIG. 12, the axial separation is the same for relative rotation of the thrust block 92 and the hub 32 in either direction.

In order to fit a tool bit, such as a common twist drill into the chuck 10, the control sleeve 16 is rotated relative to the chuck body 14 to move the control sleeve in an axially forward direction (that is, to the left in FIGS. 4 and 6). As the control sleeve 16 moves in the forward direction, the nosepiece 16, which is connected to the control sleeve through the retainer ring 78, also moves in a forward direction. The gripping cones 20 are resiliently urged in an outward direction against the internally tapered surface 58 by the spring arms 86 of the spring 82 causing the radially inward facing surface portions of the gripping cones 20 to separate to define a tool receiving gap. The stem or shank portion of the bit is then inserted through the tool receiving opening 52 of the nosepiece 18 into the gap defined by the gripping cones 20. The gripping surface 28 of the chuck body 14 is then held stationary while the control sleeve 16 is manually rotated in the opposite direction relative to the chuck body 14 to cause the control sleeve 16 to move toward the chuck body (that is, to the right of FIGS. 4 and 6). The nosepiece 18, which is carried by the control sleeve 16 through the thrust bearing 72, also moves to the right in FIGS. 4 and 6 causing the gripping cones 20 to slide relative to the internally tapered surface 58 and converge in a radially inward direction toward the stem of the drill bit. The longitudinally extending keys 64 of the nosepiece 18 and the complementary keyways 46 of the chuck body 14 ensure that the nosepiece 18 moves straight-back into the chuck body 14 without relative rotation. This straight-back movement of the nosepiece 18 prevents the gripping cones 20 from skewing or otherwise misaligning as they converge on the drill bit. When the inwardly facing surface portions of the gripping cones 20 contact and engage the stem portion of the drill bit, the control sleeve 16 is further manually rotated to hand-tighten the drill bit in place. The hand-tightening sequence forces the ball elements 110 into their respective neutral positions on the cam surfaces 100 and 40 with the thrust block 92 placing the gripping cones 20 under an axially directed compression preload. A portion of this preload is resolved by the tapered geometry of the internally tapered surface 58 and the cones 20 into the radially inward directed gripping force. As the bit is hand-tightened into the chuck 10, the spring retainer 82 and the thrust block 92 ensure that the gripping cones 20 are properly positioned to prevent the cones from axially leading or lagging one another or skewing relative to the longitudinal axis 22.

When a small diameter drill bit is tightened into the chuck 10, as shown in FIG. 4, the gripping cones 20 are located near the forward end of the internally tapered surface 58, and, when a large diameter drill bit is tightened into the chuck 10, as shown in FIG. 6, the gripping cones 20 are located near the rearwardly facing side of the tapered surface 58.

After the drill bit is hand-tightened into the chuck 10, the bit is applied to a work piece and the drive source, such as a pistol-grip electric drill, is operated to supply a driving torque to the drill bit. As the drill bit bores into the work piece, the resistance provided by the work piece generates a reaction torque through the drill bit that is overcome by the torque transmitted from the drive source. The reaction torque is transferred by frictional contact between the outside diameter surface of the drill bit to the tool-gripping surface portions of the cones 20 to cause them to roll or otherwise shift relative to the internally tapered surface 58. As the gripping cones 20 move, they circumferentially shift and carry the thrust block 92 with them causing the thrust block to rotate relative to the hub 32 of the chuck body 14. As a consequence, the cam surface 100 of the thrust block 92 is caused to rotate relative to the cam surface 40 of the chuck body 14 causing the ball elements 110 to roll relative to their respective inclined ramp surfaces. As described above in connection with FIG. 11 and FIG. 12, the thrust block 92 is moved in an axially forward direction to apply an axially directed thrust force against the blunt ends 80 of the gripping cones 20.

The torque-responsive, axially directed thrust force increases the compression loading on the gripping cones 20 with a portion of this increased load resolved by the geometry of tapered surface 58 and the cones into an increased radially inward gripping force. This increase in the gripping force takes place with relatively little, if any, axial displacement of the gripping cones 20, since the cones are preloaded into their tightened position by the initial, hand-tightening of the chuck 10. As can be appreciated, the self-tightening gripping force is proportional to the torque transmitted through the chuck 10 and increases when the drill bit encounters increased resistance in the work piece. Since the cam surfaces 40 and 100 are bi-directional in nature, the self-tightening feature of the chuck is the same regardless of the direction of rotation of the bit.

When the drill bit is removed from the work piece, the torque transmitted through the chuck 10 is diminished allowing the axially loaded parts to stress-relax and cause the cam surfaces 100 and 40 and the ball elements 110 to return to their neutral positions.

The gripping cones 20, by virtue of their conical configuration, enhance the transfer of the reaction torque from the drill bit to the thrust block 92 by cooperating with the internal surface 58 of the nosepiece 18 in a manner analogous to a planetary gear train. More specifically, the stem portion of the drill bit, the gripping cones 20, the thrust block 92, and the nosepiece 18 are analogous, respectively, to the sun, the planets, the planet carrier, and the ring of a planetary set with the torque transmitted through the thrust block 92 and the gripping cones 20 to the drill bit.

Another embodiment of a drill chuck in accordance with the present invention is shown in FIGS. 13-17 and is generally referred to therein by the reference character 200. The chuck 200 differs from the chuck 10 described above in that tapered, wedge-like gripping jaws 202 are used to grip the stem of the tool bit instead of the gripping cones 20.

The chuck 200 includes a control sleeve 204 that has a hollow, cylindrical outer portion 206, an inwardly extending flange 208 at its forward end that defines an opening 210, and an annular, internally threaded retainer ring 212 at its rearwardly facing end. The retainer ring 212 is positioned against a shoulder 214 formed on the inside diameter surface of the control sleeve 204 and secured in place by a rolled connection as indicated at 216. The outer surface of the control sleeve 204 may be provided with a knurled or striated pattern to facilitate manual gripping.

A hub 218 is provided with an internally threaded opening 220 that is adapted to engage and be secured to the threaded spindle (not shown) of a drive source such as a standard pistol-grip electric drill. The hub 218 includes external threads at 222 that engage the internal threads of the retainer ring 212 for rotation relative thereto. The forwardly facing end surface of the hub 218 is provided with caming surfaces 224 that are substantially the same as the caming surfaces 40 described above in connection with the chuck 10.

A rigid, cup-like dust shield 226 is located at the rearwardly facing end of the hub 218 with an outwardly extending flange portion 228 joining an axially extending, cylindrical wall portion 230. The outer surface of the control sleeve 204 is adapted to fit within and telescope relative to the wall portion 230 of the dust shield to prevent particulate material or other foreign matter from contaminating the external threads 222.

A nosepiece 232 is formed as a solid body of revolution about the axis 234 and includes a conical opening defined by a tapered, internal surface 236 formed therethrough. As in the case of the chuck 10, the opening is wider at its rearwardly facing end and converges to a narrow, forwardly facing tool receiving opening 238. The outer surface of the nosepiece 232 includes a shoulder 240 and a forwardly converging, externally tapered surface 242 that extends through the opening 210 in the flange 208 to the tool receiving opening 238. The external tapered surface 242 advantageously provides the chuck 200 with a tapered-end appearance or silhouette that is similar to that of conventional Jacobs-type chucks. The nosepiece 232 is mounted within the control sleeve 204 for rotation relative thereto with the outside diameter of the nosepiece journalled by the inside diameter of the control sleeve.

An anti-friction thrust bearing 244, which includes ball elements 246 and a separator 248, is located between the shoulder surface 240 of the nosepiece 232 and the inwardly facing side of the flange 208 of the control sleeve 204 and functions in a manner similar to the thrust bearing of the chuck 10 to permit relative rotation between the control sleeve and the nosepiece.

The wedge-like gripping jaws 202, which are part of a three-jaw assembly 250 (FIG. 15), are mounted in the internal opening of the nosepiece 232 with the inclined outer surfaces 252 (FIG. 16) of each jaw engaging the tapered surface 236 of the opening such that the tool gripping surfaces 254 of each jaw face inwardly toward the axis 234 and are equally spaced therefrom.

A thrust block 256 is provided, on its forwardly facing side, with radially extending channels or grooves 258 which receive the rearwardly facing butt-ends 260 of the jaws 202 and retain the jaws therein for radially inward and outward movement relative to the grooves 258. The rearwardly facing end of the thrust block 256 includes a circular recess 262 with axial-face cam surfaces 264 located at the bottom surface of the recess. The cam surfaces 264 are of the same type and substantially similar to those described above in connection with the chuck 10. The cam surfaces 264 face the cam surfaces 224 of the hub 218 with ball elements 268 separating the two cam surfaces. An elastomer "O" ring 270 is located in a peripherally formed groove on the hub 218 and contacts the rearwardly facing edge of the thrust block 256 to prevent particles or other foreign matter from contaminating the cam surfaces 224 and 264.

The jaws 202 are maintained in a equally spaced configuration about the axis 234 and are resiliently urged against the tapered surface 236 by three elastomer connecting links 272 (FIG. 15). The links 272 extend from the sides of each jaw 202, as shown in FIG. 15, with a portion of the links 272 extending through an aperture 274 formed through each jaw 202 (FIG. 16). In the open, relaxed position the links 272 locate the three gripping jaws 202 as shown by the solid-line illustration in FIG. 15, and, when the jaws are urged to their closed position, the links 272 flex or bow as indicated by the broken-line illustration.

In order to further restrict the entry of particles or other foreign matter into the cam surface area of the chuck 10, the jaw assembly 250 can be optionally provided with a thin flexible, radially extending flange 276 that is integrally formed with the links 270 (FIG. 17). The outer edge 278 of the flange is adapted to wipe the cylindrical inside diameter surface 280 of the nosepiece 232 and, in cooperation with the "O" ring 270, seal the cam surfaces of the chuck 200 against particulate contamination and other foreign matter throughout the range of adjustment of the chuck.

In order to insert a drill bit, such as a common twist drill, into the chuck 200, the control sleeve 204 is rotated relative to the hub 218 to move the control sleeve and the nosepiece 232 in an axially forward direction (that is, to the left in FIG. 14). As the control sleeve 204 moves in the forward direction, the gripping jaws 202 are resiliently urged in the outward direction against the forwardly moving internally tapered surface 236 by the elastomer connecting links 272 causing the tool contacting surfaces 254 of the jaw assembly 250 to separate and widen to define a tool receiving opening or gap. The stem or shank portion of a drill bit is then inserted into the tool receiving gap and the control sleeve 204 is manually rotated in the opposite direction to cause the control sleeve to move toward the hub 218 (that is, to the right in FIG. 14). The nosepiece 232 is likewise moved toward the hub 218 (through the thrust bearing 244) causing the jaw assembly 250 to slide relative to the internal tapered surface 236 with the individual jaws 202 moving radially inward. When the inwardly facing surfaces 254 of the jaw assembly 250 contact the drill bit, the control sleeve 204 is further rotated to hand-tighten the drill bit in place. The hand-tightening sequence forces the ball elements 268 into their respective neutral positions on the cam surfaces 224 and 264 with the thrust block 256 placing the jaws 202 under an axially directed compressive preload. A portion of this preload is resolved by the tapered geometry of the internal surface 236 and the jaws 202 into the radially inward directed gripping force. As the bit is hand-tightened into the chuck 200, the thrust block 256 ensures that the jaws 202 are properly positioned to prevent the jaws from axially leading or lagging one another or skewing relative to the longitudinal axis 234.

The respective diameters of the control sleeve 204 and hub 218 assist in increasing the hand-tightened gripping force applied to the drill bit by providing a torque-multiplying effect. As shown in FIG. 14, the radius $R_1$ of the control sleeve 204 is larger than the radius $R_2$ of the hub 218. The hand-tightening torque applied to the control sleeve 204 is multiplied in proportion to the respective radii of the control sleeve 204 and the hub 218 to increase the initial hand-tight gripping force.

When a comparitively large diameter drill bit is tightened into the chuck 200, as shown in FIG. 14, the gripping jaws 202 are located near the rearwardly facing side of the internally tapered surface 236, and, conversely, when a small diameter drill bit is tightened into the chuck 200 (not shown), the gripping jaws 202 are located near the forward end of the internally tapered surface 236.

When the drill bit is applied to a work piece and the drive source, such as a pistol-grip electric drill, is operated, the drive torque is applied through the hub 218, the ball elements 268, and the thrust block 256 to the jaws 202. As the drill bit penetrates the work piece, the resistance provided by the work piece generates a reaction torque through the drill bit that permits the hub 218 to rotate relative to the thrust block 256 causing the ball elements 268 to move from their respective neutral positions along the ramp surfaces of the cams 224 and 264 to apply an axially directed thrust load, through the thrust block 256, to the butt ends 260 of the gripping jaws 202. The anti-friction thrust bearing 244 reduces the friction between the control sleeve 204 and the nosepiece 23 to enhance the self-tightening effect and reduces the tendency of the jaws 202 to misalign during self-tightening.

The torque-responsive, axially directed thrust force increases the compressive loading on the jaws 202 with a portion of this increased load resolved by the geometry of tapered surface 236 and the jaws 202 into an increased radially inward gripping force. This increase in gripping force takes place with relatively little, if any, axial displacement of the jaws 202, since the jaws are preloaded into their tightened position by the initial, hand-tightening of the chuck 200. As can be appreciated, the self-tightening gripping force is proportional to the torque transmitted through the chuck 200 and increases when the drill bit encounters increased resistance in the work piece. Since the cam surfaces 224 and 264 are bi-directional in nature, the self-tightening feature of the chuck 200 is the same regardless of the direction of rotation of the bit.

When the drill bit is removed from the work piece, the torque transmitted through the chuck 200 is diminished allowing the axially loaded jaws 202 to stress-relax and cause the cam surfaces 224 and 264 and the ball elements 268 to return to their neutral positions.

The jaws 202, when they move relative to the internally tapered surface 236 during the hand-tightening sequence, move, with a sliding motion. This type of motion is desirable since it effectively wipes the tapered surface 236 as the chuck is operated throughout its range of adjustment to assist in clearing particulate contamination from the operating surfaces. This feature of the chuck 200 in cooperation with the dust seal 276 and the "O" ring 270 provide a chuck 200 that is ideally suited for operating under adverse conditions.

As described above, the various cam surfaces of the chuck 10 and 200 have substantially flat, planar surfaces with straight-line profiles when viewed in cross-section as illustrated in FIGS. 11 and 12. As can be readily appreciated by those skilled in the art, other cam surfaces having cam profiles defined a curved plane can be provided and, additionally, the cam surfaces can be provided with ball tracks or raceways that contain and assist in guiding the ball elements. The raceways also advantageously increase the contact surface area between the ball elements and the cam surfaces to lessen the Hertzian stresses on the balls and minimize Brinell-type surface failures of the balls or the caming surfaces.

Another embodiment of a chuck in accordance with the present invention is shown in FIGS. 18-28 and is generally referred to therein by the reference character 300. The chuck 300 differs, in part, from the chucks 10 and 200 described above in that elastomer means are provided for resiliently urging the various cam surfaces towards their respective neutral positions.

The chuck 300 is formed generally about a longitudinal axis 302 and includes a control sleeve 304, a dust shield 306, a hub 308, a nosepiece 310, a jaw assembly 312, and an end cap 314.

The control sleeve 304 is formed as a hollow body of revolution about the axis 302 and has a cylindrical outer portion 316 and an inwardly extending flange 318 at the rearwardly facing end of the sleeve. The flange 318 defines an opening 320 that is internally threaded at 322. The forwardly facing end of the control sleeve 304 is provided with a counter-bore that is internally threaded at 324 and a raised, outwardly extending gripping abutment 326 that maybe provided with a striated or knurled gripping surface.

The hub 308 is formed as a cylindrical body and includes a through opening 328 that is counter-bored and internally threaded as indicated at 330. The internal threads 330 are adapted to engage and cooperate with the external threads of a spindle (not shown) of a drive source as described in greater detail below. The hub 308 includes external threads 332 that are adapted to engage and cooperate with the internal threads of the control sleeve 304.

The dust shield 306 is formed as a cup-like body and includes a flange 334 at its rearwardly facing end which joins with an axially extending cylindrical wall portion 336 that includes a gripping surface 338 provided with a knurled or striated pattern to permit convenient manual gripping. A rearwardly extending cylindrical extension 340 is provided on the flange 334 and is adapted to mate with a knurled or striated pattern 342 formed on the rearward end of the hub 308 such that the dust shield 306 is rigidly secured to the hub 308 with the cylindrical wall portion 336 of the dust shield telescopically receiving the cylindrical portion 316 of the control sleeve 304. An internal recess 344 is formed in the internal surface of the dust shield 306 at the forward end and may be provided with a lubricated packing material to prevent particles or other foreign matter from contaminating the external threads 332 of the hub 308 throughout the range of adjustment of the chuck 300.

The nosepiece 310 is formed as a hollow body of revolution about the axis 302 and includes an internal opening 346 defined by a tapered wall surface 348. As in the case of the chucks 10 and 200, the opening 346 is wider at its rearwardly facing end and converges to a narrow, forwardly facing tool receiving opening 350. The outer surface of the nosepiece 310 is stepped near its forward end to define a shoulder surface 352 (FIG. 21) and a reduced diameter forwardly extending nose 354. A raised peripheral bearing surface 356 is provided at the rearwardly extending end of the nosepiece 310. The nosepiece 310 is received within the control sleeve 304 with the control sleeve journalled on the bearing surface 356 of the nosepiece.

The end cap 314 is provided with a central opening 358 through which the nose 354 of the nosepiece 310 extends. The end cap 314 is provided with an axially rearwardly extending portion 360 that is externally threaded at 362 to engage the internal threads 324 of the control sleeve 304.

Figure 22:
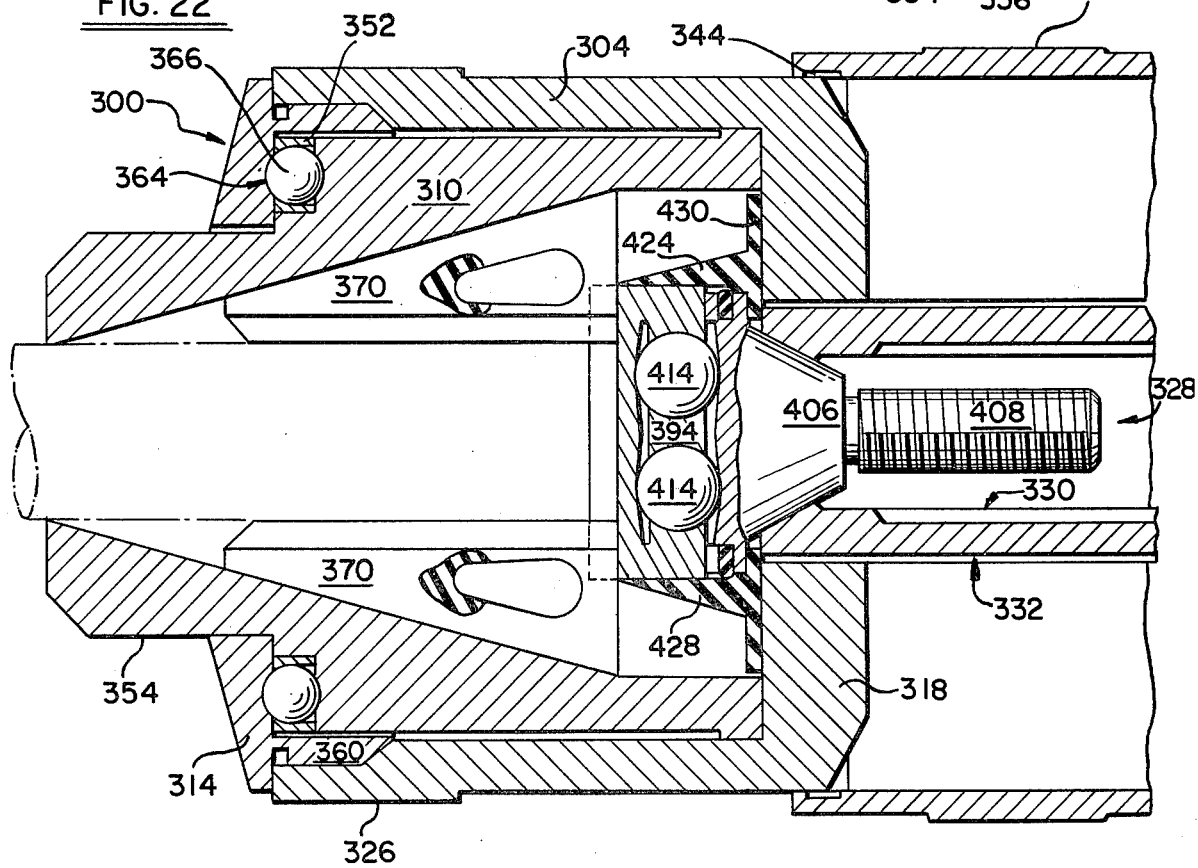
FIG. 22 is a side elevation view, similar to that of FIG. 21, showing the chuck gripping a large-diameter tool bit.

An anti-friction thrust bearing 364, which includes a plurality of ball elements 366 equally positioned relative to one another by a ball retainer 368, is located between the end cap 314 and the nosepiece 310 to permit relative rotation therebetween. The ball elements 366 are adapted to track within complementary, opposed raceways formed on the inner surface of the end cap 314 and the shoulder surface 352 of the nosepiece 310 as shown in FIGS. 21 and 22.

The jaw assembly 312 (FIGS. 19 and 20) includes three wedge-like jaws 370 each of which includes an inwardly facing tool gripping surface 372, a rearwardly facing butt surface 374, and an outwardly facing surface 376 that is adapted to engage the tapered wall 348 of the nosepiece 310. The jaws 370 are maintained in an equi-spaced relationship with respect to one another throughout the range of adjustment of the chuck 300 by elastomer links 378 that extend between the sides of the jaws 270 and that are connected together through apertures 380 that extend through each jaw. An inwardly extending elastomer tab 382 is formed at a position intermediate the ends of each link 372 and includes an opening 384 formed through its distal end. The tabs 382 assist in positively returning or restoring the cam assemblies of the chuck 300 to their respective neutral positions as explained in more detail below. The jaw assembly 312 is received within the tapered opening 346 of the nosepiece 310 with the outwardly facing surfaces 376 of each jaw 312 adapted to contact and move relative to the wall surface 348 of the nosepiece 310 during adjustment of the chuck.

Figure 23:
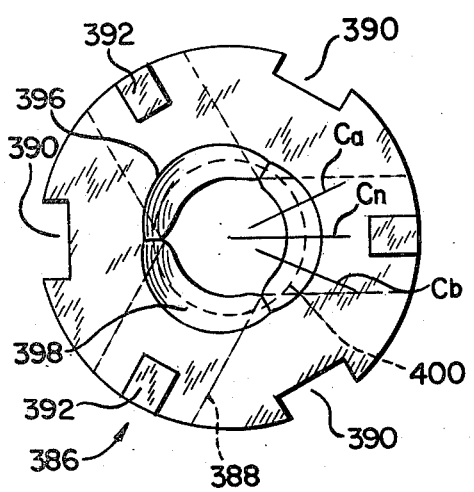
FIG. 23 is a rear view, in enlarged detail, of a thrust block.
Figure 24:
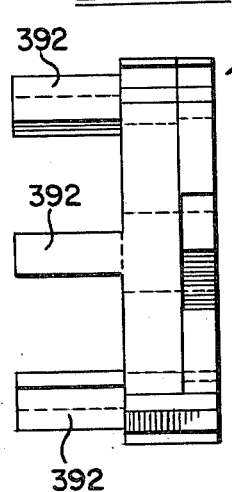
FIG. 24 is a side elevation view of the thrust block of FIG. 23 rotated 90 degrees.
Figure 25:
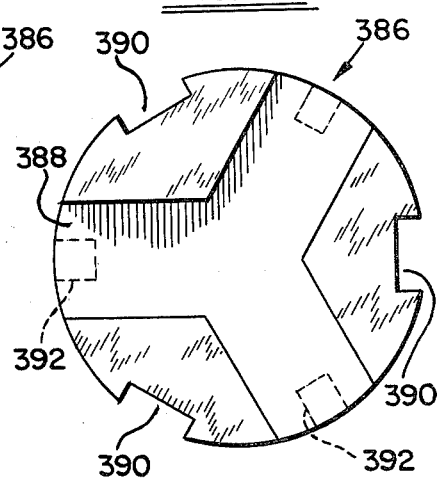
FIG. 25 is a frontal view of the thrust block of FIGS. 23 and 24.

A thrust block 386 (FIGS. 23-25) is located rearwardly of the jaw assembly 312 and is provided, on its forwardly facing surface, with three radially aligned grooves 388 which are adapted to receive the butt ends 374 of the jaws 370 and retain the jaws in place in an equi-spaced relationship relative to one another such that the tool gripping surfaces 372 of the jaws are equi-spaced from the longitudinal axis 302 throughout the range of adjustment of the chuck 300. The thrust block 386 includes three tab-receiving channels 390 formed on the peripheral surface with the channels located intermediate the jaw-receiving grooves 388. Three axially extending guide lugs 392 are formed on the rearwardly facing surface of the thrust block 386 and are in approximate axial registration with the grooves 388 formed on the opposite side thereof. The rearwardly facing surface of the thrust block, as shown in FIG. 21, is provided with a recessed cavity 394, and, as shown in FIG. 23, with three ball tracks 396, 398, and 400 formed in the bottom surface of the cavity 394. Each ball track has an intermediate or neutral cam positions $C_n$, which define a first cam means, and a thrust producing cam surface $C_a$ and $C_b$, which define a second cam means, located on each side of the neutral cam position $C_n$. The thrust producing cam surface $C_a$ and $C_b$ are each formed at an angle of inclination, e.g. $7\frac{1}{2}\%$, relative to a plane transverse to the longitudinal axis 302 with the thrust producing cam surfaces $C_a$ and $C_b$ meeting at the neutral cam position $C_n$. The thrust block 386 with its ball tracks is preferably formed using powdered-metal techniques or it may be machined with the ball tracks milled using a spherical mill offset from the longitudinal axis 302 with the mill alternately advanced into and then away from the rear surface of the thrust block as the thrust block is rotated about the longitudinal axis.

Figure 26:
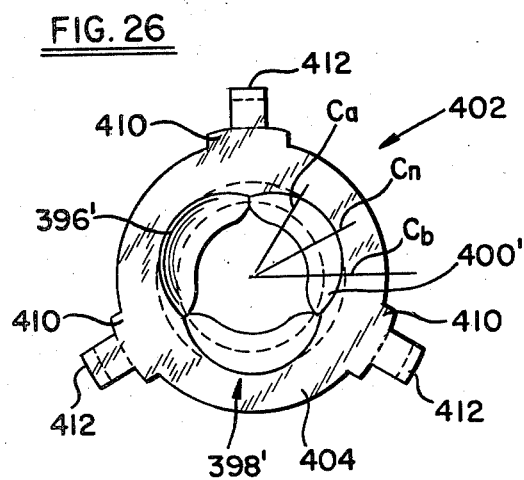
FIG. 26 is a frontal view, in enlarged detail, of the head portion of a locking screw.

A chuck locking-screw 402 is located rearwardly of the thrust block 386 and functions as a complementary cam surface member to that of the thrust block as well as a means for securing the chuck 300 in place on its drive spindle (not shown). The locking screw 402 includes (FIG. 21) an enlarged head portion 404, a tapered shank portion 406, and a threaded portion 408. As shown in FIG. 26, the forwardly facing surface of the locking screw 402 is provided with three ball tracks 396', 398', and 400' that are formed complementary to the ball tracks 396, 398, and 400 of the thrust block 386. The ball tracks of the locking screw 402 are formed in the same manner as those of the thrust block 386 and include, as shown in FIG. 26, an intermediate neutral portion $C_n$, and thrust producing cam surfaces $C_a$, and $C_b$, located on each side of the neutral cam position. The locking screw 402 is also provided with three equi-spaced abutments 410 with an anchoring post 412 extending radially outward from each abutment.

Figure 27:
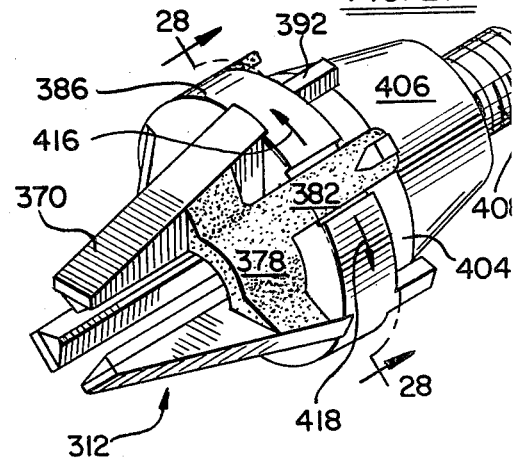
FIG. 27 is a perspective view showing the positional and operative relationship of the jaw assembly, thrust block, and locking screw.
Figure 28:
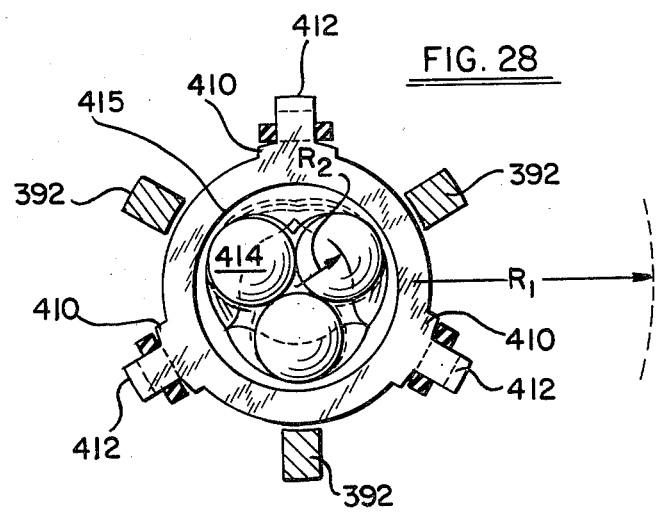
FIG. 28 is a cross-sectional view of the assembly of FIG. 27 taken along line 28—28 of FIG. 27.

The jaw assembly 312, the thrust block 386, and the locking screw 402 are connected together to form a sub-assembly as shown in FIGS. 27 and 28 with the sub-assembly contained within the chuck as shown in FIGS. 21 and 22. As shown in FIGS. 27 and 28, the jaw assembly 312 is mounted on the forwardly facing surface of the thrust block 386 with the butt surfaces 374 of the individual jaws 370 received within the jaw receiving grooves 388. Three torque transmitting ball elements 414 mounted in and maintained in an equi-spaced relationship by a ball separator 415 are located within the recessed cavity 394 of the thrust block 386 with a ball element 414 associated with each of the complementary opposed sets of ball tracks of the thrust block and the locking screw 402. The elastomer tabs 382 of the jaw assembly 312 are drawn back through the tab-receiving channels 390 of the thrust block 388 and are connected to the post 412 of the locking screw 402 with the post 412 extending through the openings 384 formed in the distal ends of the tabs. The rearwardly extending lugs 392 of the thrust block 386 contact the peripheral surface of the head portion 404 of the locking screw 402 intermediate the abutments 410 such that the jaw assembly 312 and the thrust block 386 are rotatable relative to the locking screw 402 as indicated by the arrows 416 and 418 in FIG. 28. In the position shown in FIGS. 27 and 28, the ball tracks of the thrust block 386 and the locking screw 402 are aligned with one another such that the ball elements 414 occupy the respective neutral cam positions $C_n$ of the ball tracks. The elastomer links 378 of the jaw assembly 312, in part, and the elastomer tabs 382 provide a resilient restoring or return force when the jaw assembly 312 and thrust block 388 are rotated relative to the locking screw 402. For example, if the jaw assembly 312 and the thrust block 386 are rotated relative to the locking screw 402 in the direction of the arrow 416 in FIG. 27, the tabs 382 elongate to positively urge the jaw assembly and the thrust block back to the neutral position.

The jaws, thrust block, and locking screw sub-assembly is retained within the above described parts of the chuck 300 with a flexible dust shield 420 as shown in FIGS. 21 and 22. The tapered shank portion 404 of the locking screw 402 extends into and engages a complementary tapered portion of the opening 328 of the hub 308. The complementary tapered surfaces of the locking screw 402 and the hub 308 form a self-holding tapered-fit to secure the locking screw to the hub. The thread sense of the threaded portion 408 of the locking screw 402 is opposite that of the internal threads 330 of the hub 308 such that the locking screw can engage the internal threaded portion of a drive spindle (not shown) and the internal threads of the hub 308 can engage the external threads of the drive spindle to lock the chuck 300 to the spindle in a conventional manner.

The flexible seal 420 includes an inwardly extending annular flange 422, a forwarding extending seal portion 424 that includes an inner cylindrical seal surface 426 and an inclined outer seal surface 428, and a flexible peripheral lip 430. The annular flange 422 is retained within the chuck 300 between the head portion 404 of the locking screw 402 and the forwardly extending face of the hub 308 such that the inner cylindrical seal surface 426 encircles and contacts the thrust block 386 and the outer inclined seal surface 428 contacts the tapered wall surface 48. The flexible lip 430 is designed to flex rearwardly against the tapered wall surface 348 when the jaws 370 are adjusted to their forward position, as shown in FIG. 21, and flex radially outward against the cylindrical surface portion of the internal opening 348 when the jaws are adjusted to their rearward position, as shown in FIG. 22. The seal 420 serves to protect the cam surfaces against particulate and other foreign matter contamination throughout the range of the adjustment of the chuck 300.

The operation of the chuck 300 is similar to that of the chuck 10 and the chuck 200 described above. In order to insert a drill bit into the chuck 300, the control sleeve 304 is rotated relative to the hub 308 to move the control sleeve and nosepiece 310 in an axially forward direction (that is, to the left in FIGS. 21 and 22). The flexible lip 430, as it frictionally engages the internal surfaces of the nosepiece 310, serves to "cushion" the movement of the jaws 370 in the nosepiece. As the control sleeve 304 moves in the forward direction, the gripping jaws 370 are resiliently urged in the outward direction against the forwardly moving internally tapered surface 348 by their respective elastomer connecting links 378 causing the tool contacting surfaces 372 of the jaw assembly 312 to separate and widen to define a tool receiving opening or gap. During adjustment of the control sleeve 304, the elastomer links 378 resiliently urge the individual jaws 370 into contact with the internally tapered surface 348 and maintain the jaws in an equi-spaced relationship about the axis. Also, the elastomer links prevent the jaws 370 from skewing or twisting relative to one another and the chuck axis. The stem or shank portion of a drill bit is then inserted into the tool receiving gap and the control sleeve 304 manually rotated in the opposite direction to cause the nosepiece 310 to move toward the hub 308 causing the jaw assembly 312 to slide relative to the internal tapered surface 348 with the individual jaws 370 moving radially inward. When the inwardly facing surfaces 372 of the jaw assembly 312 contact the drill bit, the control sleeve 304 is further rotated to hand-tighten the drill bit in place. The hand-tightening sequence forces the ball elements 414 into their respective neutral positions on the various cam surfaces with the thrust block 386 placing the jaw elements 372 under an axially directed compressive preload. A portion of this preload is resolved by the tapered geometry of the internal surface 348 and the jaws 372 into the radially inward directed gripping force. The anti-friction thrust bearing reduces the friction between the control sleeve and the nosepiece to enhance the self-tightening effect and reduces the tendency of the jaws 370 to misalign. As the bit is hand-tightened into the chuck 300, the thrust block 386 ensures that the jaws 372 are properly positioned to prevent the jaws from axially leading or lagging one another or skewing relative to the longitudinal axis 302.

As in the case of the chuck 200, the respective radius of the control sleeve 304 relative to the radius of the ball elements 414 from the axis 302 assists in increasing the hand-tightened gripping force applied to the drill bit by providing a torque multiplying effect. As shown in FIG. 28, the radius $R_1'$ of the control sleeve 304 (shown in schematic form) is larger than the radius $R_2'$ of the ball elements 414 from the axis 302. The hand-tightening torque applied to the control sleeve 304 is multiplied in proportion to the respective radii of the control sleeve 304 and the radii of the ball elements 414 to increase the initial hand-tightened gripping force on the tool bit.

When a small diameter drill bit is tightened into the chuck 300, as shown in FIG. 21, the gripping jaws 370 are positioned near the forward end of the internal tapered surface 348, and, when a comparitively large diameter drill bit is tightened into the chuck 300, as shown in FIG. 22, the gripping jaws 370 are located near the rearwardly facing side of the internally tapered surface.

When the drill bit is applied to a work piece and the drive source, such as a pistol-grip electric drill, is operated, the drive torque is applied through the hub 308, the ball elements 414, and the thrust block 386 to the jaws 370. As the drill penetrates the work piece, a resistance provided by the work piece generates a reaction torque through the drill bit that permits the hub 308 and the locking screw 402 to rotate relative to the thrust block 386 causing the ball elements 414 to move from their respective neutral positions along the complementary cam tracks described above of the thrust block 386 and the locking screw 402 to apply an axially directed thrust load through the thrust block 386 to the butt ends 374 of the gripping jaws 370.

The torque-responsive, axially directed thrust force increases the compressive loading on the jaws 370 with a portion of this increased load resolved by the geometry of the tapered surface 348 and the jaws 376 into an increased radially inward gripping force. This increase in gripping force takes place with relatively little, if any, axial displacement of the jaws 370, since the jaws are preloaded into their tightened position by the initial, hand-tightening of the chuck 300. As can be appreciated, the self-tightening gripping force is proportional to the torque transmitted through the chuck 300 and is operative regardless of the direction of rotation of the bit.

When the drill bit is removed from the work piece, the torque transmitted through the chuck 300 is diminished allowing the axially loaded jaws 370 to stress-relax and cause the cam surfaces and the ball elements 414 to return to their respective neutral positions. As in the case of the chuck 200, the jaws 370, when they move relative to the internally tapered surface 348 during the hand-tightening sequence, move with a sliding motion that assists in clearing particulate contamination from the operating surfaces. This feature of the chuck 300 in cooperation with the dust shield 306 and the flexible shield 420 provide a chuck 300 that is ideally suited for operating under adverse conditions.

Each of the chucks described above can be provided with indicating lines or graduations to indicate the size of the tool receiving gap defined between the various gripping elements. For example, the barrel portion 24 of the chuck 10 can be provided with axially spaced indicator lines which, when measured against the rearwardly facing edge of the control sleeve 16, provide a general indication of the tool bit diameter contained within the chuck. Likewise, similar indicating lines can be provided on the control sleeve 204 of the chuck 200 and the control sleeve 304 of the chuck 300.

The chuck embodiments described above have been disclosed as including opposed, thrust transmitting elements each having a cam surface means thereon. As can be appreciated, the axial thrust will be developed if only one of the thrust transmitting elements is provided with a cam surface means.

While the various chucks have been described in connection with a pistol-grip electric drill as the drive source, they are equally suitable for other applications including drill presses, the headstock chuck of lathes, milling and boring machines, and the like as well as the stationary chucks used for tailstock applications and for the tool holding applications of a turret lathe. In addition, the chuck can, of course, hold various types of cutting tools other than drill bits described above including reamers, side mills, end mills, and the like.

As will be apparent to those skilled in the art, various changes and modifications may be made to the chuck of the present invention without departing from the spirit and scope of the present invention as recited in the appended claims and their legal equivalent.

What is claimed is:

1. A self-tightening chuck for gripping an object such as a tool bit or the like comprising:
   a nose piece having a tapered surface that defines an internal opening for receiving a tool bit along an axis;
   a plurality of gripping elements located within said opening in contact with said tapered surface to define a tool receiving gap therebetween, said gripping elements movable relative to said tapered surface throughout a range of adjustment to engage a tool bit in said tool receiving gap and for applying a gripping force to the tool bit in response to a thrust force applied to said gripping elements;
   a control sleeve rotatably mounted on said nose piece and adjustably connected to a chuck body means for relative adjustment therebetween throughout a range of adjustment to vary the size of the tool receiving gap and to cause said gripping elements to forcibly grip a tool bit therebetween, said chuck body having means for effecting attachment to a drive source;
   a first axial face cam located in said chuck and coupled to said gripping elements for applying a thrust force thereto;
   a second axial face cam confronting said first axial face cam for connection through said chuck body to a drive source;
   said first and second confronting axial face cams defining plural opposed cam surface sets therebetween, a rolling element disposed between the opposed cam surfaces of each set, each rolling element contacting, on the one side, the cam surface of one of said axial face cams and, on the other side thereof, the opposite cam surface of the other axial face cam, said first and second axial face cams mutually cooperating to apply a thrust force to said gripping elements in response to a torque applied through said chuck to increase the gripping force applied by said gripping elements.

2. A self-tightening chuck for gripping an object such as a tool bit or the like comprising:
a nose piece having a tapered surface that defines an internal opening for receiving a tool bit along an axis;
a plurality of gripping elements located within said opening in contact with said tapered surface to define a tool receiving gap therebetween, said gripping elements movable relative to said tapered surface throughout a range of adjustment to engage a tool bit in the tool receiving gap and for applying a gripping force to the tool bit in response to a thrust force applied to said gripping elements;
a control sleeve rotatably mounted on said nose piece and adjustably connected to a chuck body means for relative adjustment therebetween throughout a range of adjustment to vary the size of the tool receiving gap and to cause said gripping elements to forcibly grip a tool bit therebetween;
a first axial-face cam located in said chuck and coupled to said gripping elements for applying a thrust force thereto;
a second axial-face cam confronting said first axial face cam for coupling through said chuck to a drive source;
said first and second confronting axial face cams defining plural, opposed sets of cam surfaces therebetween, a rolling element disposed between the cam surfaces of each set, said axially face cams mutually cooperating to apply a thrust force to said gripping elements in response to a torque applied though said chuck to increase the gripping force applied by said gripping elements to the tool bit, said cam surfaces configured to apply a thrust force to said gripping elements in either a first or a second rotary direction.

3. The self-tightening chuck claimed in claims 1 or 2 wherein
each of said cam surface sets on said first and second axial face cams includes a first and a second oppositely inclined ramp surface which define a neutral position at their intersection;
said rolling elements, when said control sleeve is adjusted relative to said chuck body to grip a tool bit, occupying said neutral positions in their respective opposed cam surface sets;
said first and second axial face cams responsive to a torque applied through said chuck to rotate relative to one another;
said rolling elements, when a torque is applied through said chuck in a first direction advancing, on their one sides, relative their respective first inclined cam surfaces on one of said axial face cams and advancing, on their other sides thereof, relative to their respective second inclined ramp surfaces on the other axial face cam to apply the thrust force to said gripping elements; and p1 said rolling elements, when a torque is applied through said chuck in a second direction, advancing, on their one sides thereof, relative their respective second inclined ramp surfaces on said one axial face cam and advancing, on their other sides thereof, relative to their respective first inclined ramp surfaces on said other of said axial face cams.

4. The self-tightening chuck claimed in claim 3 further comprising:
resilient elastomeric urging means connected between said gripping elements and said axial face cams for restoring said first and second axial face cams to said neutral position upon removal of the torque applied through said chuck.

5. The self-tightening chuck claimed in claim 4 wherein said resilient elastomeric urging means comprises:
first elastomeric links connected to and extending between each adjacent gripping element; and
a second elastomeric link connected in tension between each first elastomeric links and said axial face cams;
whereby the application of a torque through said chuck causes said first and second axial face cams to rotate relative one another to further tension said second elastomeric links, said so-tensioned second elastomeric links restoring said first and second axial face cams to said neutral position when the torque applied through said chuck is removed.

6. The self-tightening chuck claimed in claim 5 wherein:
each second elastomeric link is connected to a respective first elastomeric link at a mid-point thereof.

7. The self-tightening chuck claimed in claim 4 further comprising:
a thrust receiving antifriction bearing located between said control sleeve and said nose piece for reducing the friction therebetween to facilitate the return of said first and second axial face cams to their respective neutral positions by said tensioned second elastomeric links when torque applied through the chuck is removed.

8. The self-tightening chuck claimed in claim 3 wherein said ramp surfaces are inclined at an angle between 5° and 25° relative to a plane transverse to said chuck axis.

9. The self-tightening chuck claimed in claims 1 or 2, further comprising:
a thrust block having on one side thereof surface formations adapted to engage said gripping elements to maintain said gripping elements in a plane transverse to said chuck axis and for guiding said gripping elements during movement to and from said axis, said thrust block having one of said axial face cams formed on the other side thereof.

10. The self-tightening chuck claimed in claim 9 wherein:
said thrust block surface formations comprise radially aligned grooves for receiving and guiding said gripping elements during movement to and from said chuck axis.

11. A self-tightening chuck for releasably gripping an object such as a tool bit or the like comprising:
a nose piece having a tapered surface that defines an internal opening for receiving a tool bit along an axis;
a plurality of tapered gripping elements located within said opening and defining a tool receiving gap therebetween, said gripping elements movable relative to said tapered surface throughout a range of adjustment for engaging a tool bit in said tool receiving gap and for applying a gripping force to the tool bit in response to a thrust force applied to said gripping elements;
a control sleeve rotatably mounted on said nose piece and adjustably connected to a chuck body for relative adjustment therebetween, adjustment of said control sleeve relative to said chuck body causing said gripping elements to move relative to said tapered surface to forcibly grip a tool bit;

axial face cam means located within said chuck for applying a thrust force to said gripping elements in response to the torque transmitted through said chuck to increase the gripping force applied by said gripping elements to a tool bit gripped therebetween, said axial face cam means including at least two confronting axial face cams rotatable relative one another from a neutral position to thereby apply the thrust force to said gripping elements; and elastomeric link means connected in tension between said at least two axial face cam means to resiliently urge said axial face cam means to said neutral position.

12. A self-tightening chuck for releasably gripping an object such as a tool bit or the like comprising:

a nose piece having a tapered surface that defines an internal opening for receiving a tool bit along an axis;

a plurality of tapered gripping elements located within said opening defining a tool receiving gap therebetween, said gripping elements movable relative to said tapered surface throughout a range of adjustment to engage a tool bit in said tool receiving gap and for applying a gripping force to the tool bit in response to a thrust force applied to said gripping elements;

a control sleeve rotatably mounted on said nose piece and adjustably connected to a chuck body for relative adjustment therebetween, adjustment of said control sleeve relative to said chuck body causing said gripping elements to move relative to said tapered surface to forcibly grip a tool bit;

first axial-face cam means located in said chuck and coupled to said gripping elements for applying a thrust force thereto;

second axial-face cam means confronting said first axial face cam means for coupling through said chuck to a drive source;

said first and second confronting axially face cams having a plurality of opposed cam surface sets and a roller element disposed between the cam surfaces of each set, said cam surfaces mutually defining a neutral position, said cams rotatable relative one another in response to a torque applied through said chuck to apply a thrust force to said gripping elements to increase the gripping force applied by said gripping elements; and elastomeric link means coupled in tension between said first and second axial face cam means to resiliently urge said axial face cam means to said neutral position.

13. The self-tightening chuck claimed in claims 11 or 12 wherein each of said cam surface sets on said first and second axial face cams includes a first and a second oppositely inclined ramp surface which define a neutral position at their intersection;

said rolling elements, when said control sleeve is adjusted relative to said chuck body to grip a tool bit, occupying said neutral positions in their respective opposed cam surface sets;

said first and second axial face cams responsive to a torque applied through the chuck to rotate relative to one another;

said rolling elements, when a torque is applied through said chuck in a first direction advancing, on their one sides, relative their respective first inclined cam surfaces on one of said axial face cams and advancing, on their other sides thereof, relative to their respective second inclined ramp surfaces on the other axial face cam to apply the thrust force to said gripping elements; and said rolling elements, when a torque is applied to said chuck in a second direction, advancing, on their one sides thereof, relative their respective second inclined ramp surfaces on said one axial face cam and advancing, on their other sides thereof, relative to their respective first inclined ramp surfaces on said other of said axial face cams.

14. The self-tightening chuck claimed in claim 11 or 12 wherein said elastomeric link means further comprises:

first elastomer links connected between each adjacent gripping element for equally spacing said gripping elements about said chuck axis;

second elastomeric links connected in tension between said first elastomeric links and said axial face cam means, relative rotation of said axial face cam means from said neutral position further tensioning said second elastomeric links to provide a tension force to resiliently urge said axial face cam means to said neutral position.

15. The self-tightening chuck claimed in claim 14 wherein:

said second elastomeric links are connected to respective said first elastomeric link means at a mid-point thereof.

16. The self-tightening chuck claimed in claim 14 wherein said axial face cam means include outwardly extending tabs for attachment thereto of one end of said second elastomer links said one end opposite to the end attached to said first elastomeric links.

17. A self-tightening chuck for releasably gripping an object such as a tool bit or the like comprising:

a nose piece having a tapered surface that defines an internal opening for receiving a tool bit along an axis;

a plurality of gripping elements located within said opening and in contact with said tapered surface and defining a tool receiving gap therebetween, said gripping elements movable relative to said tapered surface throughout a range of adjustment to engage a tool bit in said tool receiving gap and for applying a gripping force to the tool bit in response to a thrust force applied to said gripping elements;

a control sleeve rotatably mounted on said nose piece and adjustably connected to a chuck body for relative adjustment therebetween, adjustment of said control sleeve relative to said chuck body causing said gripping elements to move relative to said tapered surface to forcibly grip a tool bit;

a thrust receiving anti-friction bearing located between said control sleeve and nose piece for reducing the friction therebetween;

a first axial face cam means located in said chuck and coupled to said gripping elements to apply a thrust force thereto;

a second axial face cam means confronting said first axial face cam means for coupling through said chuck to a drive source;

said first and second confronting axial face cams defining plural opposed sets of cam surface sets therebetween, a rolling element disposed between the opposed cam surfaces of each cam surface set;

said first and second axial face cam means cooperating to apply a thrust force to said gripping elements in response to a torque applied through said chuck to increase the gripping force applied by said gripping element.

18. A chuck for forcibly gripping a tool bit in response to manual adjustment thereof and for increasing the gripping force applied to the tool bit in response to a torque applied through the chuck, said chuck comprising:

a nose piece having a tapered surface that defines an internal opening for receiving a tool bit along an axis;

a plurality of tapered gripping elements located within said opening and defining a tool receiving gap therebetween, said gripping elements movable relative to said tapered surface throughout a range of adjustment to engage a tool bit in said tool receiving gap and for applying a gripping force to the tool bit in response to a thrust force applied to said gripping elements;

a control sleeve rotatably mounted on said nose piece and adjustably connected to a chuck body for relative adjustment therebetween throughout a range of adjustment;

a thrust receiving antifriction bearing mounted between said nose piece and said control sleeve to reduce the friction therebetween during adjustment of said chuck;

first axial-face cam means located in said chuck and coupled to said gripping elements for applying a thrust force thereto;

said second axial face cam means confronting said first axial face cam means for coupling through said chuck to a drive source;

said first and second confronting axially face cam means having a plurality of opposed cam surface sets and a roller element disposed between the cam surfaces of each set, said cam surfaces mutually defining a neutral position, manual adjustment of said control sleeve relative to said chuck body causing said gripping elements to move relative said tapered surface to forcibly grip a tool bit and causing said axial face cam means and said rolling elements to assume said neutral position, said antifriction bearing reducing the friction between said control sleeve and said nose piece to facilitate the forcible gripping of the tool bit and the neutral positioning of the first and second axial face cams, said cams rotatable relative one another in response to a torque applied to said chuck to apply a thrust force to said gripping elements to increase the gripping force applied by said gripping elements and rotatable relative one another to return to said neutral position upon removal of said so-applied force, said antifriction bearing lowering the friction between said nose piece and control sleeve to facilitate relative rotation between said axial face cams during application of a torque through said chuck to increase the gripping force and to facilitate relative rotation between said axial face cams upon the removal of the so-applied torque to return said axial face cams to their neutral positions.

19. The chuck claimed in claims 17 or 18 wherein each of said cam surface sets on said first and second axial face cam means includes a first and a second oppositely inclined ramp surface which define a neutral position at their intersection;

said rolling elements, when said control sleeve is adjusted relative to said chuck body to grip a tool bit, occupying said neutral positions in their respective opposed cam surface sets;

said first and second axial face cam means responsive to a torque applied through the chuck to rotate relative to one another;

said rolling elements, when a torque is applied through said chuck in a first direction advancing, on their one sides, relative their respective first inclined cam surfaces on one of said axial face cam means and advancing, on their other sides thereof, relative to their respective second inclined ramp surfaces on the other axial face cam means to apply the thrust force to said gripping elements; and said rolling elements, when a torque is applied to said chuck in a second direction, advancing, on their one sides thereof, relative their respective second inclined ramp surfaces on said one axial face cam means and advancing, on their other sides thereof, relative to their respective first inclined ramp surfaces on the other of said axial face cam means.

20. A self-tightening chuck for gripping an object such as a tool bit or the like comprising:

a nose piece having a tapered surface that defines an internal opening for receiving a tool bit along an axis;

a plurality of gripping elements located within said tool opening in contact with said tapered surface to define a tool receiving gap therebetween, said gripping elements movable relative to said tapered surface throughout a range of adjustment to engage a tool bit in said tool receiving gap and for applying a gripping force to said tool bit in response to a thrust force applied to said gripping element;

a control sleeve rotatably mounted on said nose piece and adjustably connected to a chuck body means for relative adjustment therebetween throughout a range of adjustment to vary the size of said tool receiving gap;

axial face cam means located within said chuck for applying a thrust force to said gripping elements in response to the torque transmitted through said chuck to increase the gripping force applied by said gripping elements to a tool bit gripped therebetween, said axial face cam means including at least two confronting axial face cams rotatable relative to one another from a neutral position to thereby apply the thrust force to said gripping elements; and flexible seal means positioned within said chuck to protect said first and second axial face cam means from foreign matter, said flexible seal means connected to and movable with said gripping elements and including a peripheral sealing lip in continuous sealing engagement with said tapered surface throughout the range of adjustment of said chuck.

21. The self-tightening chuck claimed in claim 20, wherein said peripheral sealing lip, when said chuck is adjusted to receive a tool bit of a first diameter, extends substantially radially outward to contact said tapered surface, and said peripheral sealing lip, when said chuck is adjusted to receive a tool bit of a smaller diameter, flexes from said radially outward position toward a position substantially parallel to said tapered surface.

22. A self-tightening chuck for releasably gripping an object such as a tool bit or the like comprising:
a nose piece having a tapered surface that defines an internal opening for receiving a tool bit along an axis;
a plurality of tapered gripping means located within said opening defining a tool receiving gap therebetween, said gripping means movable relative to said tapered surface throughout a range of adjustment to engage a tool bit in said tool receiving gap and adapted to apply a gripping force to said tool bit in response to a thrust force applied to said gripping means;
a control sleeve rotatably mounted on said nose piece and adjustably connected to a chuck body for relative adjustment therebetween, adjustment of said control sleeve relative to said chuck body causing said gripping means to move relative to said tapered surface to forcibly grip a tool bit, said chuck body adapted to be connected to a drive source;
fastener means for securing said chuck body to a drive source;
a first axial face cam located in said chuck and coupled to said gripping means for applying a thrust force thereto;
a second axial face cam formed on said fastener means and confronting said first axial face cam;
said first and second confronting axial face cams defining plural opposed cam surface sets therebetween, a rolling element disposed between the opposed cam surfaces of each set, each rolling element contacting, on the one side, the cam surface of one of said axial face cams and, on the other side thereof, the cam surface of the other axial face cam, said first and second axial face cams mutually cooperating to apply a thrust force to said gripping elements in response to a torque applied through said chuck to increase the gripping force applied by said gripping elements.

23. The self-tightening chuck claimed in claim 22 wherein said fastener means comprises:
a chuck locking screw adapted to threadedly engage the spindle of a drive source, said locking screw including a head portion having said second axial face cam formed thereon.

* * * * *